(12) United States Patent
Duesterwald et al.

(10) Patent No.: US 7,865,778 B2
(45) Date of Patent: Jan. 4, 2011

(54) METHOD AND SYSTEM FOR DETECTING SYNCHRONIZATION ERRORS IN PROGRAMS

(75) Inventors: Evelyn Duesterwald, Ossining, NY (US); Yuan Zhang, Newark, DE (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 11/676,853

(22) Filed: Feb. 20, 2007

(65) Prior Publication Data

US 2008/0201629 A1    Aug. 21, 2008

(51) Int. Cl.
G06F 11/36    (2006.01)
(52) U.S. Cl. .................... 714/38; 714/48; 717/126; 717/132
(58) Field of Classification Search ................ 717/126, 717/132; 714/38, 48
See application file for complete search history.

(56) References Cited

U.S. PATENT DOCUMENTS

| | | | | |
|---|---|---|---|---|
| 5,802,374 | A * | 9/1998 | Gupta et al. | 717/149 |
| 6,286,130 | B1 * | 9/2001 | Poulsen et al. | 717/119 |
| 6,718,484 | B1 * | 4/2004 | Kodera | 714/35 |
| 7,089,543 | B2 * | 8/2006 | Rising, III | 717/144 |
| 7,159,211 | B2 * | 1/2007 | Jalan et al. | 717/149 |
| 7,475,385 | B2 * | 1/2009 | Huemiller, Jr. | 717/127 |
| 7,552,428 | B2 * | 6/2009 | Stoodley et al. | 717/148 |
| 7,673,295 | B1 * | 3/2010 | Lin | 717/156 |
| 7,716,645 | B2 * | 5/2010 | Dolby et al. | 717/126 |
| 2002/0124241 | A1 * | 9/2002 | Grey et al. | 717/149 |

OTHER PUBLICATIONS

Susan Horwitz, et al. "Interprocedural Slicing Using Dependence Graphs". ACM Transactions on Programming Languages and Systems, Jan. 1990, 26-60, vol. 12, No. 1.
Mark Weiser, "Program Slicing", IEEE Transactions on Software Engineering, 1981, 352-357,vol.10, No. 4.
Evelyn Duesterwald et al. "Concurrency Analysis in the Presence of Procedures Using a Data-Flow Framework", In Proceedings of the Symposium on Testing, Analysis, and Verification,1991, pp. 36-48.
Stephen P. Masticola et al. "Nonconcurrency Analysis", In Proceedings of the Fourth ACM SIGPLAN Symposium on Principles & Practice of Parallel Programming, May 1993, pp. 129-138, San Diego, California.

(Continued)

*Primary Examiner*—Stephen M Baker
(74) *Attorney, Agent, or Firm*—Scully, Scott, Murphy & Presser, P.C.; Anne V. Dougherty, Esq.

(57) ABSTRACT

A method and system for error detection in programs with collective synchronization and/or procedures are provided. In one aspect, the method and system may use interprocedural analysis for matching synchronizations in a program in order to detect synchronization errors, and, if no such errors exist, may determine the synchronization phases of the program. The method and system in one aspect may use a combination of path expressions and interprocedural program slicing to match the synchronization statements that may execute along each program path. If the synchronization matching succeeds, the method and system in one aspect may determine the sets of synchronization statements that synchronize together. A matching failure may indicate the presence of a synchronization error and the method and system in one aspect may construct a counter example to illustrate the error.

20 Claims, 11 Drawing Sheets

OTHER PUBLICATIONS

Tor E. Jeremiassen et al. "Static Analysis of Barrier Synchronization in Explicitly Parallel Systems", In Proceedings of the IFIP WG 10.3 Working Conference on Parallel Architectures and CompilationTechniques, PACT '94, pp. 171-180.

Arvind Krishnamurthy et al. "Analyses and Optimizations for Shared Address Space Programs", J. Parallel Distrib. Comput., 1996, 130-144, vol. 38, No. 2.

Yuan Lin. "Static Nonconcurrency Analysis of Openmp Programs", In First International Workshop on OpenMP, 2005.

Alexander Aiken, et al. "Barrier Inference", In Proceedings of the 25th ACM SIGPLAN-SIGACT Symposium on Principles of Programming Languages, 1998, pp. 342-354.

A Krishnamoorthy, et al. "Parallel Programming in Split-C", In Supercomputing '93 Proceedings, Nov. 1993, pp. 262-273.

Stephen F. Siegel, et al. "Using Model Checking With Symbolic Execution to Verify Parallel Numerical Programs", In Proceedings of the 2006 International Symposium on Software Testing and Analysis, 2006, pp. 157-167.

Peng Tu, et al. "Gated SSA-based demand driven symbolic analysis for parallelizing compilers", In Conference Proceedings, 1995 International Conference on Supercomputing, pp. 414-423, Barcelona, Spain, Jul. 1995.

Cormac Flanagan, et al. "Modular Verification of Multithreaded Programs", Theor. Comput. Sci.,2005, 153-183, vol. 338, No. 1-3.

Alain Darte, et al. "A Linear-time Algorithm for Optimal Barrier Placement", In Proceedings of the tenthACM SIGPLAN symposium on Principles and Practice of Parallel Programming, 2005, pp. 26-35.

Chau-Wen Tseng, "Compiler Optimizations for Eliminating Barrier Synchronization", In Proceedings of the Fifth ACM SIGPLAN Symposium on Principles & Practice of Parallel Programming, Jul. 1995, pp. 144-155, Santa Barbara, California.

Michael O'Boyle et al, "Compile Time Barrier Synchronization Minimization", IEEE Trans. Parallel Distrib.Syst., 2002, 529-543, vol. 13, No. 6.

Shuyi Shao et al, "A Compiler Based Communication Analysis Approach for Multiprocessor Systems", 2006.

P.Hulfinger et al, "Titanium Language Reference Manual", Technical Report UCB/EECS-2005-15, 2005; U.C. Berkeley.

David Callahan et al, "Analysis of Event Synchronization in a Parallel Programming Tool", In Proceedings of the Second ACM SIGPLAN Symposium on Principles & Practice of Parallel Programming, Mar. 1990, pp. 21-30; Seattle, Washington.

Stephen F. Siegel and George S. Avrunin, "Modeling wildcard free mpi programs for verification", In Proceedings of the tenth ACM SIGPLAN Symposium on Principles and Practice of Parallel Programming, pp. 95-106, 2005.

Robert E . Tarjan, "A unified approach to path problems", Journal of the ACM, 28(3):577-593, Jul. 1981.

G.A. Venkatesh, The semantic approach to program slicing. In Proceedings of the ACM SIGPLAN '91 Conference on Programming Language Design and Implementation, pp. 107-119, Toronto, Ontario, Jun. 1991.

Karl J. Ottenstein, et al. "The program dependence graph in a software development environment", Software Engineering Notes, 9(3), 1984.

Ron Cytron, et al. "Efficiently computing static single assignment form and the control dependence graph", ACM Transactions on Programming Languages and Systems, 13(4):451-490, Oct. 1991.

Cytron, Ron et al., Efficiently computing static single assignment form and the control dependence graph, ACM Transactions on Programming Languages and Systems, Oct. 1991, pp. 451-490, 13(4).

Eclipse Parallel Tools Platform (PTP) project, www. eclipse. org / ptp.

* cited by examiner

```
main(){
    int x=0;
    int rank = get_rank();
    ...
S1: if(rank == 0){
        ...
    } else {
        ...
        barrier; // b1
    }
                        S2: if(x > 0){
                                ...
                            } else {
                                ...
                                barrier; // b2
                            }
                        }                    ⎫
                                             ⎬ 102
                                             ⎭
```

Fig. 1

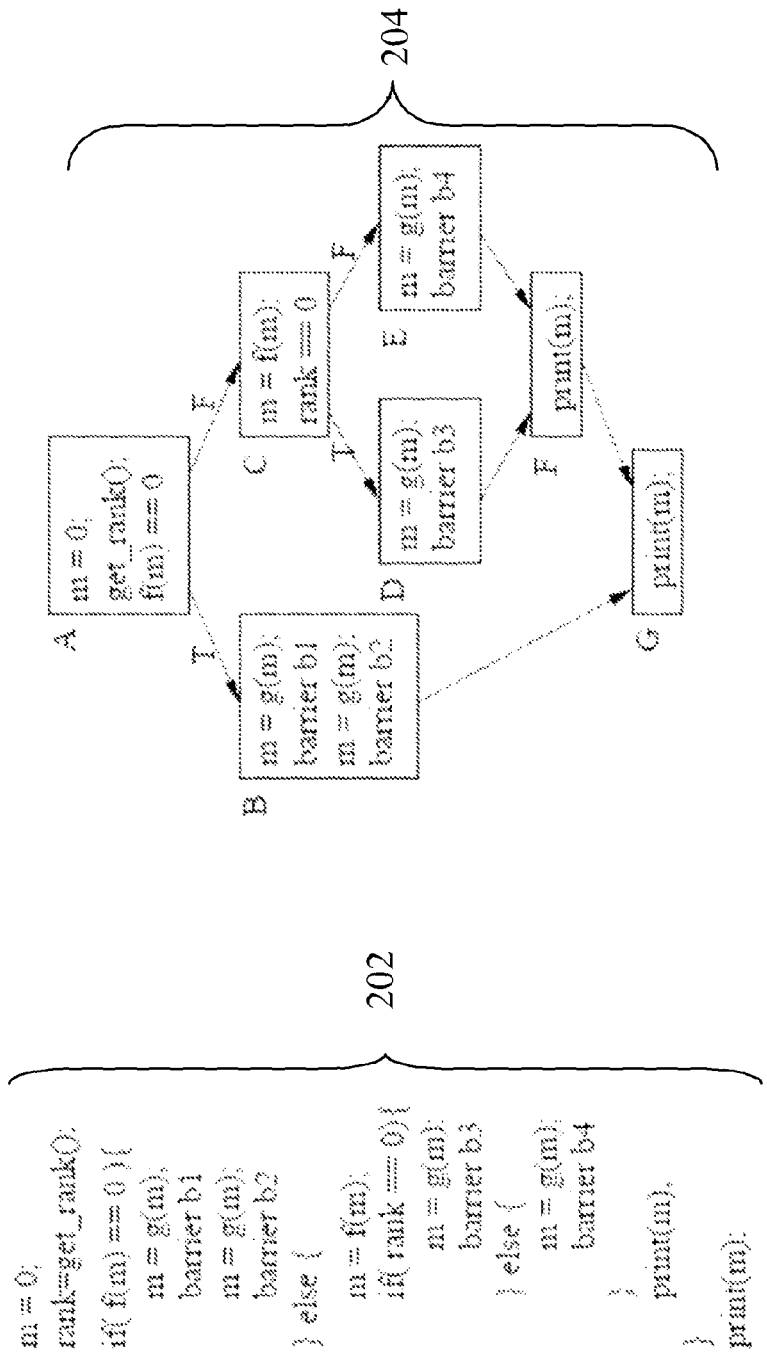
Fig. 2A (a) Example program
Fig. 2B (b) Control flow graph (d) Modified dependence graph with ψ-nodes and ψ-dependence edges

```
rank=get_rank();
if (rank <= n) {
  f();
  barrier;
}
if (rank <= n) {
  g();
  barrier;
}
```
302

(a) Structurally
incorrect
but error-free

Fig. 3A

```
rank=get_rank();
while (i++ < rank) {
  f();
  barrier;
}
```
304

(b) Structurally incorrect,
not well-matched and
producing a synchronization
error

Fig. 3B

```
rank=get_rank();
if (rank > n) {
  i = 0;
  while (i++ < 1) {
    f();
    barrier;
  }
} else {
  g();
  barrier;
}
```
306

(c) Structurally correct
but not well-matched

Fig. 3C

```
procedure main
if(single-valued) {
    while(single-valued) p ;
} else {
    if( multi-valued )
        barrier; // b1
    else
        q;
}
```

$T_{main} = (T_p)^* \mid^c (b1 \mid^c T_q)$

```
procedure p
if( multi-valued ) {
    barrier; // b2
    ......
    barrier; // b3
} else {
    barrier; // b4
    ......
    barrier; // b5
}
```

$T_p = (b2 \cdot b3) \mid^c (b4 \cdot b5)$

```
procedure q
if( multi-valued ) {
    barrier; // b6
} else {
    barrier; // b7
}
```

$T_q = b6 \mid^c b7$

| No. | Direction | Match(t1, t2) | | Actions | Direction |
|---|---|---|---|---|---|
| 1 | ↓ | t1:b1 | t2:b2 | Add matching set ((t1, b2)) | ↓ |
| 2 | ↓ | t1 △ | △ t3 ○ △ t2 | Match(t1, t3) | ↓ |
| 3 | ↓ | t1 △ | △ t3 ○ △ t2 | Match(t1, t3) | ↓ |
| 4 | ↓ | ○ △ t3 △ t1 | ○ △ t3 △ t4 | Match(t3, t4) | ↓ |

Fig. 8

METHOD AND SYSTEM FOR DETECTING SYNCHRONIZATION ERRORS IN PROGRAMS

STATEMENT REGARDING FEDERALLY SPONSORED RESEARCH OR DEVELOPMENT

This invention was made with Government support under Contract No.: NBCH30390004 awarded by DARPA—Defense Advanced Research Projects Agency. The Government has certain rights in this invention.

FIELD OF THE INVENTION

The present invention relates to concurrent programming and more particularly to detecting synchronization errors in programs.

BACKGROUND OF THE INVENTION

SPMD (Single Program Multiple Data) is a popular parallel programming paradigm. Typically, SPMD-style programs or the like have a barrier synchronization primitive that can be used to partition the program into a sequence of parallel phases. When a thread reaches a barrier statement it cannot proceed until all other threads have arrived at the barrier statement. Barriers are textually aligned if all threads must reach the same textual barrier statement before they can proceed. A barrier synchronization error occurs, for example, if a thread bypasses a barrier, leaving the remaining threads stalled.

Popular parallel programming models, such as MPI and OpenMP, allow barriers to be textually unaligned. Textually unaligned barriers make it difficult for the programmer to understand the synchronization phases in the program, and they can easily lead to synchronization errors. MPI (The Message Passing Interface (MPI) standard. http://wwwunix.mcs.anl.gov/mpi/) and OpenMP (OpenMP C/C++ Manual. http://www.openmp.org/specs/), two widely used parallel programming models, place few or, in the case of MPI, no constraints on the placement of barrier statements in the program. Barrier statements may be textually unaligned making it more difficult for programmers to understand the synchronization structure of the program and, thus, easier to write programs with synchronization errors. Textually unaligned barriers also hinder concurrency analysis (Evelyn Duesterwald and Mary Lou Soffa. Concurrency analysis in the presence of procedures using a data-flow framework. In Proceedings of the Symposium on Testing, Analysis, and Verification, pages 36-48, 1991; Stephen P. Masticola and Barbara C. Ryder. Nonconcurrency analysis. In Proceedings of the Fourth ACM SIGPLAN Symposium on Principles & Practice of Parallel Programming, pages 129-138, San Diego, Calif., May 1993; Tor E. Jeremiassen and Susan J. Eggers. Static analysis of barrier synchronization in explicitly parallel systems. In Proceedings of the IFIP WG 10.3 Working Conference on Parallel Architectures and Compilation Techniques, PACT '94, pages 171-180, Montŕ eal, Qú ebec, August 1994. North-Holland Publishing Company; Arvind Krishnamurthy and Katherine Yelick. Analyses and optimizations for shared address space programs. J. Parallel Distrib. Comput., 38(2):130-144, 1996; Yuan Lin. Static nonconcurrency analysis of openmp programs. In First International Workshop on OpenMP, 2005) because understanding which barrier statements form a common synchronization point is a prerequisite to analyzing the ordering constraints imposed by the program. Some concurrency analyses therefore require barriers to be named or textually aligned (Arvind Krishnamurthy and Katherine Yelick. Analyses and optimizations for shared address space programs. J. Parallel Distrib. Comput., 38(2):130-144, 1996; Tor E. Jeremiassen and Susan J. Eggers. Static analysis of barrier synchronization in explicitly parallel systems. In Proceedings of the IFIP WG 10.3 Working Conference on Parallel Architectures and Compilation Techniques, PACT '94, pages 171-180, Montŕ eal, Qú ebec, August 1994. North-Holland Publishing Company; Yuan Lin, Static nonconcurrency analysis of openmp programs. In First International Workshop on OpenMP, 2005).

A previous work on verifying barrier synchronization by Aiken and Gay (Alexander Aiken and David Gay. Barrier inference. In Proceedings of the 25th ACM SIGPLAN-SIGACT Symposium on Principles of Programming Languages, pages 342-354, 1998) on a barrier inference rule system detects a class of synchronization errors, however, they require user annotations to handle procedures and their analysis does not explicitly compute the matching function among barriers. While Aiken and Gay address verification of textually unaligned barriers and the related problem of determining multi-valued expressions with a set of inference rules implemented for Split-C (A Krishnamoorthy, U Culler, A Dusseau, S Goldstein, S Lumetta, T von Eicken, and K Yelick. Parallel Programming in Split-C. In Supercomputing '93 Proceedings, pages 262-273, November 1993), their rule system cannot automatically handle procedures and assumes user annotations to describe the effect of procedures.

There have been other approaches to verifying synchronization in parallel programs using model checking (Stephen F. Siegel, Anastasia Mironova, George S. Avrunin, and Lori A. Clarke. Using model checking with symbolic execution to verify parallel numerical programs. In Proceedings of the 2006 International Symposium on Software Testing and Analysis, pages 157-168, 2006; Stephen F. Siegel and George S. Avrunin. Modeling wildcard free mpi programs for verification, In Proceedings of the tenth ACM SIGPLAN Symposium on Principles and Practice of Parallel Programming, pages 95-106, 2005). The techniques based on model checking do not share the assumption of structural correctness but they are more expensive resulting in scalability problems. There have also been some efforts on static checking of shared memory programs. One such example is Calvin (Cormac Flanagan, Stephen N. Freund, Shaz Qadeer, and Sanjit A. Seshia. Modular verification of multithreaded programs. Theor. Comput. Sci., 338(1-3):153-183, 2005), which is based on automatic theorem proving.

Other related work includes barrier optimization approaches that optimize the usage of barriers (Alain Darte and Robert Schreiber. A linear-time algorithm for optimal barrier placement. In Proceedings of the tenth ACM SIGPLAN symposium on Principles and Practice of Parallel Programming, pages 26-35, 2005; Chau-Wen Tseng. Compiler optimizations for eliminating barrier synchronization. In Proceedings of the Fifth ACM SIGPLAN Symposium on Principles & Practice of Parallel Programming, pages 144-155, Santa Barbara, Calif., July 1995; Michael O'Boyle and Elena Stohr. Compile time barrier synchronization minimization. IEEE Trans. Parallel Distrib. Syst., 13(6):529-543, 2002) by eliminating unnecessary barriers or optimizing the placement of barriers. Some research work identifies communication patterns, such as send/receive pairs, for MPI programs (Shuyi Shao, Alex K. Jones, and Rami Melhem. A compiler based communication analysis approach for multiprocessor systems, 2006).

The multi-valued expression problem has first been addressed by the inference rule system by Aiken and Gay.

Aiken and Gay suggest to introduce a single qualifier as was done in the Titanium language (P. Hulfinger, D. Bonachea, K. Datta, D. Gay, S. Graham, B. Liblit, G. Pike, J. Su, and K. Yelick. Titanium language reference manual. Technical Report UCB/EECS-2005-15, U. C. Berkeley, 2005) to explicitly describe expressions that are single-valued. There has been a body of work on concurrency analysis of parallel programs, including SPMD programs (David Callahan, Ken Kennedy, and Jaspal Subhlok. Analysis of event synchronization in a parallel programming tool. In Proceedings of the Second ACM SIGPLAN Symposiumon Principles & Practice of Parallel Programming, pages 21-30, Seattle, Wash., March 1990; Evelyn Duesterwald and Mary Lou Soffa. Concurrency analysis in the presence of procedures using a dataflow framework. In Proceedings of the Symposium on Testing, Analysis, and Verification, pages 36-48, 1991; Stephen P. Masticola and Barbara G. Ryder. Nonconcurrency analysis. In Proceedings of the Fourth ACM SIGPLAN Symposium on Principles & Practice of Parallel Programming, pages 129-138, San Diego, Calif., May 1993). Concurrency analysis uses the synchronization constructs in the program to determine which portions of the program may execute in parallel. Some concurrency analyses focus on analyzing the barriers in the program to establish concurrency information (Tor E. Jeremiassen and Susan J. Eggers. Static analysis of barrier synchronization in explicitly parallel systems. In Proceedings of the IFIP WG 10.3 Working Conference on Parallel Architectures and Compilation Techniques, PACT '94, pages 171-180, Montŕ eal, Qú ebec, August 1994. North-Holland Publishing Company; Arvind Krishnamurthy and Katherine Yelick. Analyses and optimizations for shared address space programs, J. Parallel Distrib. Comput., 38(2):130-144, 1996; Yuan Lin. Static nonconcurrency analysis of openmp programs. In First International Workshop on OpenMP, 2005). However, these approaches do not verify the correctness of barrier synchronization.

BRIEF SUMMARY OF THE INVENTION

A method and system for detecting synchronization error in programs are provided. The programs, for example, may include collective synchronization such as barriers or broadcasts, and/or procedures. In another aspect, the programs may include any other synchronization constructs, for example, not limited to collectives but also one-to-one synchronization such as message passing. The method in one aspect may comprise determining concurrent paths in a program with synchronization or one or more procedures or in a program with a combination of synchronization and one or more procedures, constructing one or more synchronization expressions in the concurrent paths, determining whether said one or more synchronization expressions match, and computing a matching function that maps synchronization statements in said one or more synchronization expressions if said one or more synchronization expressions match.

The method in another aspect may further include constructing a counter example to illustrate an error if said one or more synchronization expressions do not match. The method in yet another aspect may be performed statically without having to run the program in which the synchronization error is being detected.

A system for detecting synchronization errors in a program in one aspect may comprise means for determining concurrent paths in a program with synchronization or one or more procedures or in a program with a combination of synchronization and one or more procedures, means for constructing one or more synchronization expressions in the concurrent paths, means for determining whether said one or more synchronization expressions match, means for computing a matching function that maps synchronization statements in said one or more synchronization expressions if said one or more synchronization expressions match, and means for constructing a counter example to illustrate an error if said one or more synchronization expressions do not match. Such means may include, but are not limited to, a computer processor, controller, software or firmware.

In another aspect, a program storage device readable by machine, tangibly embodying a program of instructions executable by the machine to perform the above method of detecting one or more errors in one or more programs is also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 illustrates an example program having barriers.

FIGS. 2A-2D show a program fragment in C, its control flow graph, associated program dependence graph and modified dependence graph in one embodiment respectively.

FIGS. 3A-3C show a code fragment that is structurally incorrect free of synchronization error, an example of a structurally incorrect program that also contains a synchronization error, and structurally correct but not well-matched program fragment, respectively.

FIG. 8 illustrates barrier matching rules for concatenation trees in one embodiment.

DETAILED DESCRIPTION

Figure 2C:
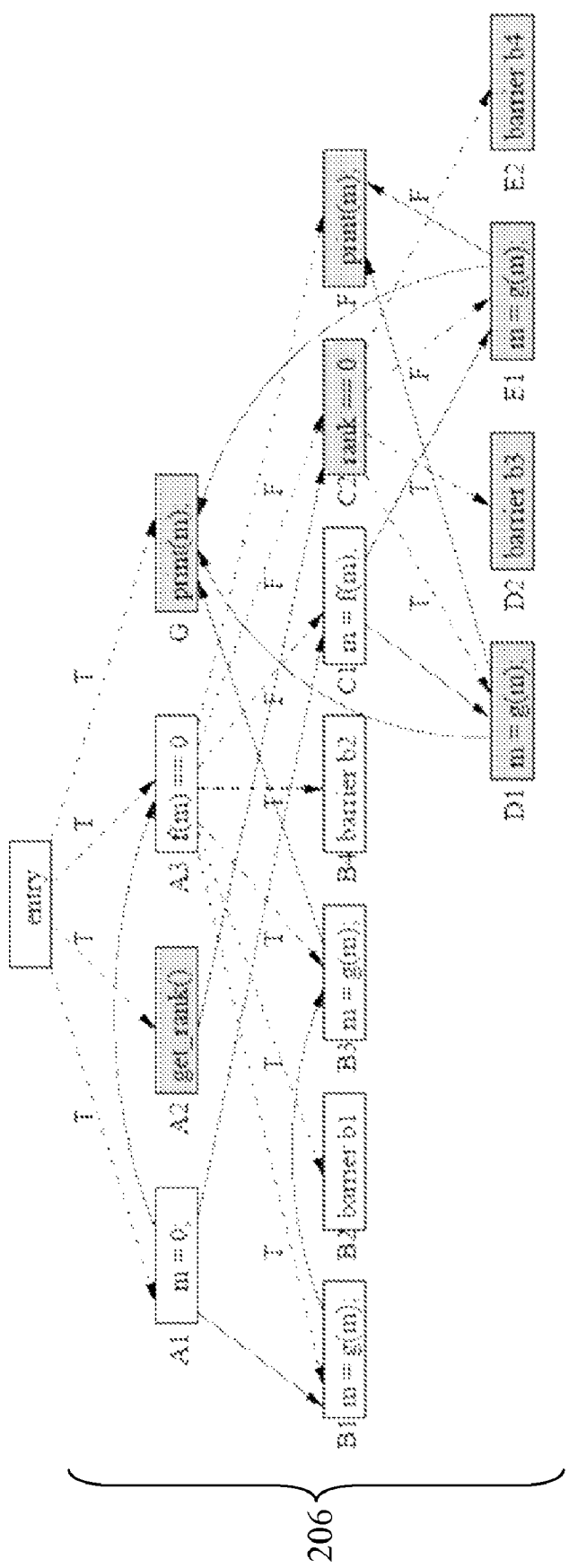

A method and system for detecting synchronization errors in programs, for instance, with collective synchronization such as barriers and/or procedures, other synchronization constructs that are not only collectives but also one-to-one synchronization such as message passing, or any other synchronization are disclosed. In one embodiment, the method and system detect synchronization errors in programs statically, that is, without having the program execute. In one embodiment the method and system may use an interprocedural synchronization (e.g., barrier) matching technique, for example, for SPMD-style programs or the like with textually unaligned synchronization constructs to detect errors. Synchronization matching in the present disclosure detects synchronization errors, for instance, by matching synchronizing statements. If the matching succeeds, the program is free of synchronization errors and a synchronization matching function is computed that maps each synchronization statement s to the set of synchronization statements that synchronize with s for at least one instance of s. A matching failure may indicate a synchronization error for which the method and system of the present disclosure may provide a counter example that illustrates the error. Synchronization matching functions provide more information than a verification of the program's synchronization structure alone because they expose synchronization constructs that are textually unaligned. Programmers can use this information to improve readability of their code by eliminating textually unaligned synchronization constructs. The information can also be used to validate the programmer's mental view of the synchronization structure of the program. Used in this way, synchronization matching information can aid in the detection of more subtle algorithmic problems with the use of synchronization.

In the following description, figures and examples, barriers are used as an example synchronization construct. It should be understood, however, that the method and system of the present disclosure may apply to any other synchronizations, including but not limited to, other collective synchronizations, non-collective synchronization such as one-to-one synchronization, etc.

FIG. 1 shows a sample SPMD-style program fragment 102 with two barriers. The function get rank( ) returns the unique thread identifier of the calling thread. Get rank( ) is similar to the "MPI Comm rank( )" library function in MPI and corresponds to the "omp get thread num( )" library function in OpenMP. The barrier construct shown in the figure is known as "#pragma omp barrier" in OpenMP and as the "MPI barrier (<communicator>)" function call in MPI. A synchronization error occurs in the conditional S1 because all threads except that with rank 0 reach the barrier b1 and get stalled. However, the conditional S2 is free of errors because all threads agree on the value of x. The synchronization matching analysis of the present disclosure in one embodiment may report a matching error at barrier b1 and calculate the matching function for barrier b2 as M(b2)={b2}. To detect synchronization errors such as barrier synchronization errors and to compute synchronization matching functions such as a barrier matching function, the method and system of the present disclosure in one embodiment may use a combination of path expressions and interprocedural slicing. Path expressions are described in Robert E. Tarjan. A unified approach to path problems. Journal of the ACM, 28(3):577-593, July 1981. Interprocedural slicing is explained in Susan Horwitz, Thomas Reps, and David Binkley. Interprocedural slicing using dependence graphs. ACM Transactions on Programming Languages and Systems, 12(1):26-60, January 1990.

In one embodiment, the method and system of the present disclosure may proceed in three steps:

Step 1: Multi-Valued Expressions: In SPMD-style programs or the like all threads execute the same program but they may execute different program paths. In one embodiment, the method and system determine which program paths may be executed concurrently. The method and system in one embodiment determines concurrent paths, for example, by computing the multi-valued expressions in the program. An expression is multi-valued if it evaluates differently in different threads. If used as control predicates, multi-valued expressions split threads into different concurrent program paths. In the example shown in FIG. 1, rank is a multi-valued variable while x is not. The method and system in one embodiment present a new interprocedural solution to the multi-valued expression problem that is based on interprocedural program slicing.

Step 2: Synchronization Expressions: The next step in one embodiment constructs a synchronization expression at each program point. A synchronization expression is a special form of a path expression that, for a given program point, describes the sequences of synchronization constructs that may execute until a thread reaches that point. Synchronization expressions provide a compact representation of the synchronization structure of the program. Synchronization expressions are also referred to as synchronization trees.

Step 3: Synchronization Matching: The results of the previous steps may be used to match synchronization expressions against each other. In one embodiment, for the program to be correct, synchronization expressions match at points where concurrent threads meet. Synchronization matching algorithm further may provide the corresponding synchronization matching function in case of a successful match. A matching failure may indicate a synchronization error for which the method and system may provide a counter example by constructing two or more program paths that illustrate the error.

In one embodiment, the method and system of the present disclosure in one embodiment may detect synchronization errors using an interprocedural solution. Furthermore, in addition to verifying correct synchronization, the method and system in one embodiment may establish the synchronization matching functions to expose the synchronization phases of the program and the presence of textually unaligned synchronization constructs. After detecting one synchronization error the method and system in one embodiment may continue to analyze the portions of the program that are unaffected by the error. Thus, the method and system in one embodiment may report multiple synchronization error warnings for some areas of the program and a matching function for others. The results of the synchronization matching method and system can be used to detect synchronization errors, to expose textually unaligned synchronization constructs, and to provide the input to a concurrency analysis. In one embodiment, the synchronization matching method and system may be implemented as an MPI checking tool as part of the Eclipse Parallel Tools Platform (PTP) project (www.eclipse.org/ptp). The checker may be applied to various programs such as MPI/C programs to analyze the synchronization structure of benchmarks such as MPI benchmarks.

Thus, the system and method of the present disclosure in one embodiment may provide an interprocedural solution to the multi-valued expression problem to determine the concurrent program paths in programs, for example, an SPMD-style program. In another embodiment, synchronization matching may be introduced as an interprocedural synchronization verification analysis. The method and system may generate or compute a matching function exposing textually unaligned synchronization constructs in addition to the verification result. The method and system may be used as a synchronization checking tool such as an MPI synchronization checking tool for C and may function as an evaluation of the tool on a set of MPI benchmarks.

Synchronization Matching Overview

In one embodiment, the method and system of the present disclosure is applicable to SPMD-style programs or the like with synchronization constructs that may be unnamed and textually unaligned. The method and system in one embodiment may determine whether the synchronization constructs in the program are well-matched, and if they are, compute or generate a synchronization matching function. The synchronization constructs in a program are well-matched, for example, if all concurrent threads execute the same number of synchronization constructs. In one embodiment, the method and system formulate this problem as a path flow problem over a graphical representation of the program, such as the program's control flow graph (CFG). The CFG of a program is a directed graph $G=(N,E)$ with a set of nodes N that represent the program's basic blocks and a set of control flow edges E connecting the nodes. A program path is a connected sequence of nodes in G.

FIG. 2A shows a program fragment in C 202 and its control flow graph 204 is shown in FIG. 2B. Sequential data flow problems are usually solved by computing a solution over all paths in the CFG. There may be a distinction between an all-paths solution in a sequential program and the notion of all-paths in an SPMD-style program. In SPMD-style programs, some of the program paths may be concurrent while others may not be. Program properties may hold for all concurrent paths, but not for all program paths. The CFG in FIG. 2B illustrates this point. There are three paths from node A to node G: P1: A B G, P2: A C D F G, and P3 A C E F G. The number of barriers executed along these paths differs: two barriers for P1 and one barrier for P2 and P3. However, not all three paths are concurrent. The predicate at node C is multi-valued creating two concurrent paths P2 and P3. The program is well-matched because along the two concurrent paths the number of barriers is the same.

In one embodiment, a path problem in the presence of concurrent paths may be formulated as follows.

Definition 2.1. (Execution Trajectory) Given an SPMD style program, an execution trajectory T with respect to an execution E of the program is the set of program paths from start to exit that are executed by each thread in E.

Definition 2.2. (Concurrent Paths) Two program paths p1 and p2 with p1≠p2 are called concurrent if there exists an execution trajectory that contains both paths.

A synchronization matching problem may be defined as a path problem as follows:

Definition 2.3. (Synchronization Matching Problem) Synchronization constructs in an SPMD-style program or the like are well-matched if for every set of concurrent paths from program start to program exit the number of synchronization constructs is same along each path.

Thus, in one embodiment, concurrent paths in the program are determined for synchronization matching. In many SPMD programming styles, concurrent paths are not explicit in the program text. They can be derived from the program points at which concurrent threads split and the points at which they meet again. To determine these concurrent split and meet points the method and system in one embodiment may compute the multi-valued expressions in the program as described below.

The method and system in one embodiment may handle programs with arbitrary control flow. For structured programs (i.e., programs without goto statements) simpler algorithms may be used. In one embodiment, every program can be transformed into a structured program using goto elimination. When simpler algorithms for structured programs are available both the general algorithm for arbitrary control flow and the simpler algorithm for structured programs may be described and used. Programmers typically use synchronization in a highly structured way. In general, correct parallel programs are also structurally correct. Informally, structural correctness means that a program property holds for a program if it holds for every structural component of the program, (i.e., every statement, expression, corn pound statement, etc.). The assumption of structural correctness allows the method and system to break down the verification problem for the whole program into a series of smaller problems, one for each structural component.

More formally, the method and system define structural correctness with respect to a property P based on the abstract syntax tree (AST) of a structured program as follows. Definition 2.4. (Structural Correctness) Let T be the AST of a structured program P, P is structurally correct with respect to property P if each subtree of T is structurally correct with respect to P.

The structural correctness assumption shows that the synchronization constructs in a program are well-matched by inductively showing that the synchronization constructs in all subtrees of the program's AST are well-matched. Structural correctness is sufficient but not necessary for a program to be correct. The example from FIG. 2A is structurally correct. FIG. 3A shows a code fragment 302 that is structurally incorrect because each conditional, if viewed in isolation, is incorrect. However, the fragment is free of synchronization errors. FIG. 3B shows an example of a structurally incorrect program 304 that also contains a synchronization error. Synchronization matching in the present disclosure verifies that an SPMD style program or the like is structurally correct and free of synchronization errors.

In the following description, the method and system of the present disclosure are explained in the context of MPI programs as an example. It should be understood, however, that the method and system of the present disclosure may also be applied to different programs with or without some adjustments. For example, applying the analysis shown in the method and system of the present disclosure may need adjustments to represent OpenMP's concurrency constructs in the control flow graph and to account for shared variables in the multi-valued expression analysis.

Multi-Valued Expressions

In one embodiment of the present disclosure, multi-valued expressions are computed to determine the concurrent paths in the program, or more specifically, to determine the thread split and meet points. In addition to being used as input to synchronization matching, information about concurrent paths is useful by itself and can provide an important tool for program understanding. An expression is multi-valued if it evaluates differently in different threads. Conversely, an expression that has the same value in all threads is called single-valued. Parallel programs typically contain multi-valued seed expressions, such as library calls that return a thread identifier (e.g., "MPI Comm rank" in MPI, and "omp get thread num" in OpenMP). All multi-valued expressions may be directly or indirectly derived from these initial multi-valued seeds. In one embodiment, multi-valued expression problem may be solved as a program slicing problem.

An embodiment of the method and system of the present disclosure utilizes program slicing and system dependence graph to determine multi-valued expressions. Program slicing was first introduced by Weiser (Mark Weiser. Program slicing. IEEE Transactions on Software Engineering, 10(4): 352-357, July 1984). Venkatesh (G. A. Venkatesh. The semantic approach to program slicing. In Proceedings of the ACM SIGPLAN '91 Conference on Programming Language Design and Implementation, pages 107-119, Toronto, Ontario, June 1991) later defined a forward slice as follows: given a program point p and a variable v, the forward slice is the set of statements that are affected by the value of variable v at point p. Ottenstein and Ottenstein (Karl J. Ottenstein and Linda M. Ottenstein. The program dependence graph in a software development environment. Software Engineering Notes, 9(3), 1984) recasts the slicing problem as a graph reachability problem using the program dependence graph. The program dependence graph contains nodes for all statements in the program and two types of edges: data dependence edges and control dependence edges. The forward slice for a node n that defines a variable v is the set of nodes reachable from n in the program dependence graph. Horwitz et al. (Susan Horwitz, Thomas Reps, and David Binkley. Interprocedural slicing using dependence graphs. ACM Transactions on Programming Languages and Systems, 12(1):26-60, January 1990) extended the work by Ottenstein and Ottenstein on program dependence graphs by developing an interprocedural solution to program slicing. Their interprocedural extension of the program dependence graph is called a system dependence graph.

FIG. 2C shows the program dependence graph 206 as an example. The slice for variable rank at node A2, shown as the set of shaded nodes, contains all nodes reachable along control or data dependence edges.

Forward slicing may overestimate the multi-valued expressions. There is a difference between the dependence information used in traditional program slicing and the dependence information needed for computing multi-valued expressions. FIG. 2C illustrates this difference. Variable m is single-valued at node C and first becomes multi-valued at node F when the threads that split at node C meet again. Variable m is single-valued at nodes D and E because it has the same value for all threads that execute these nodes. However, the forward slice on rank includes nodes D and E because they are control dependent on C2.

In one embodiment, computing multi-valued expressions may include some adaptations of existing slicing algorithms. Instead of control dependence edges, the method and system of the present disclosure determines or uses edges from multi-valued predicates to the points where the values of variables that are control-dependent on the predicates merge. In the example in FIG. 2C, the method and system of the present disclosure determines or uses an edge from C2 to F.

Figure 2D:
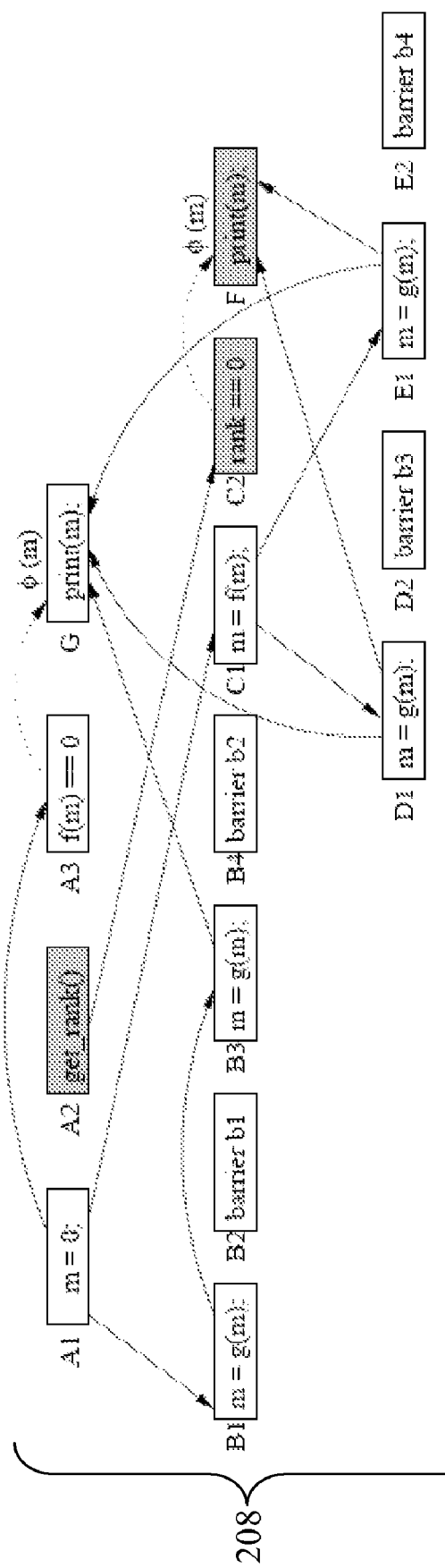

A notion of value merge dependence can be found in Static Single Assignment Form (SSA) (Ron Cytron, Jeanne Ferrante, Barry K. Rosen, Mark N. Wegman, and F. Kenneth Zadeck. Efficiently computing static single assignment form and the control dependence graph. ACM Transactions on Programming Languages and Systems, 13(4):451-490, October 1991). SSA Form uses φ-nodes to represent the new value of a variable at join points where multiple definitions of the variable are merged. In FIG. 2D φ-nodes would be placed at nodes F and G. Gated SSA form is a refinement of SSA in which each φ-node is connected to the controlling predicate (Peng Tu and David Padua. Gated SSA-based demand driven symbolic analysis for parallelizing compilers. In Conference Proceedings, 1995 International Conference on Supercomputing, pages 414-423, Barcelona, Spain, July 1995). The method and system of the present disclosure in one embodiment refer to such a predicate as the φ-gate and call the edges connecting a φ-gate with the corresponding φ-nodes "φ-edges". The method and system of the present disclosure in one embodiment uses φ-edges as dependence edges for multi-valued slicing problem. FIG. 2D shows a modification of the program dependence graph 208 from (c) with φ-nodes and φ-edges.

For structured programs the method and system in one embodiment can determine φ-gates and φ-nodes directly from the nesting structure. In the general case, the algorithm described in Peng Tu and David Padua can be used.

Based on the notions of φ-nodes and φ-gates the method and system in one embodiment can inductively define multi-valued expressions as follows:

Definition (Multi-Valued Expressions) An expression e is multi-valued if one of the following holds:
(i) e is a multi-valued seed (e.g., a thread library call that returns a different value in each thread),
(ii) e is data-dependent on a multi-valued expression,
(iii) e is a φ-node with a multi-valued φ-gate.

Figure 4:
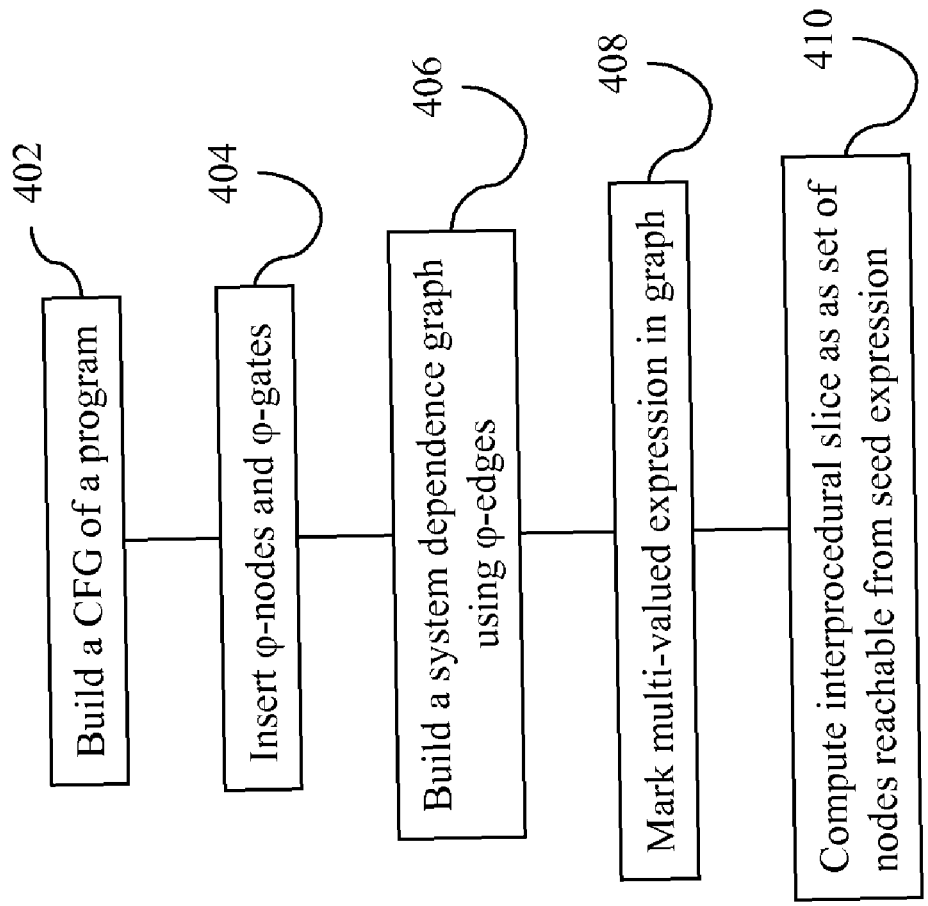
FIG. 4 illustrates a multi-valued slicing algorithm in one embodiment.

The method and system in one embodiment can define multi-valued expression analysis as an adaptation of program slicing. FIG. 4 shows an overview of this approach. At 402, control flow graph is built for a program. An example of a control flow graph was shown in FIG. 2B. At 404, φ-nodes and φ-gates are inserted. As described above, φ-gates represent one or more predicates controlling one or more split points and are inserted at a point in the graph where executing threads split. Thus, in the example shown in FIG. 2C, for the variable "rank", a φ-gate may be inserted at C2 where the expression "if (rank==0)" controls split path in the program. φ-nodes are inserted at the meet points of those threads. In the example shown in FIG. 2C, a φ-node is inserted at F, a point in the program where the split paths from the "if" predicate at C2 meet. At 406, system dependence graph is built, for example, using φ-edges in place of control dependence edges. For the example shown in FIG. 2C, a system dependence graph shown at 2D is generated. For the variable "rank", φ-edge is generated from a split point to a meet point, i.e., node C2 to node F. At 408, multi-valued seed expressions are marked in the graph. In the example shown in FIG. 2D, multi-valued seed expression for the variable "rank" is at node A2, for instance, where the variable is assigned a value. In general, to compute one or more multi-valued expressions in one embodiment, phi gates and phi nodes are inserted based on program split points and meet points, phi edges are then generated between the phi gates and phi nodes. All nodes reachable from a multi-valued seed expression are determined as multi-valued expressions.

After replacing control dependence edges with φ-edges the method and system in one embodiment may use the existing algorithm for interprocedural slicing developed by Horwitz et al. to compute the multi-valued expressions in the program, that is, by finding nodes that are reachable from a given node in the modified system dependence graph. After computing the multi-valued expression slice the method and system in one embodiment may determine the concurrent paths in the slice by identifying and marking the concurrent split and meet points in the graph as follows. The concurrent split points are identified as the φ-gates that are contained in the slice. Similarly, the concurrent meet points result as the φ-nodes contained in the slice. After the concurrent split and meet points in the graph have been marked, the marks are transferred to the corresponding nodes in the synchronization expressions as follows. Every alternation operator in a synchronization expression corresponds to a meet node in the graph. The alternation operator is marked concurrent if the corresponding meet node in the graph was marked concurrent. Similarly, every iteration operator in a synchronization expression corresponds to a meet node in the graph and the iteration operator is marked as concurrent if the corresponding meet operator was marked concurrent.

Library Calls

Thread library calls may produce both multi-valued expressions (such as MPI Comm rank in MPI), or single-valued expressions (such as a broadcast). An embodiment of the method and system assume that thread library interfaces are annotated as either single- or multivalued. If no such annotations are available, the method and system in one embodiment can conservatively treat all thread library calls as producing multi-valued seed expressions. Other library function calls return single-valued expressions.

Handling Pointers and Arrays

Pointers and arrays impact the multi-valued expression computation by complicating the determination of accurate data dependences. The program dependence graph need to safely represent all possible data dependences in order for the multi-valued expression slicing to be a safe approximation.

A simple conservative handling of arrays models each array as a single object. Pointers can be modeled safely by treating every dereference of a pointer and every variable whose address is taken as a multi-valued seed. A conservative slicing computation may overestimate the multi-valued expressions in the program, which, in turn, may lead to spurious synchronization error warnings. The accuracy of the slice can be improved by applying a pointer analysis such as shown in L. O. Andersen. Program Analysis and Specialization For the C Programming Language. PhD thesis, University of Copenhagen, 1994, prior to the construction of the program dependence graph. For at least scientific SPMD applications, simple pointer and array approximations often suffice to avoid spurious error warnings.

Synchronization Expressions

The next step constructs synchronization expressions. Synchronization expressions are a special form of Tarjan's path expressions. A path expression at a node n in a CFG represents all paths from the beginning of the program to node n. Path expressions are regular expressions built using node labels as terminal symbols and the operators:
- • (concatenation), | (alternation), and * (quantification or iterations). For example, in FIG. 2A the path expression at node G is A•(B|(C•(D|E)•F)•G.

Path expressions have been used to build data flow analyzers by interpreting node labels as data flow functions, path concatenation as flow function composition, alternation as taking the meet of functions, and quantification as finding the fixed point of a function.

A synchronization expression is a path expression that uses synchronization statement labels instead of node labels as terminal symbols. A synchronization expression at a program point n represents the sequences of synchronization constructs that may execute along any path from the beginning of the program to node n. If a synchronization expression B represents a synchronization sequence b1, b2, . . . , bn, then in one embodiment of the method and system of the present disclosure, that B "derives" n synchronization constructs.

An embodiment of the method and system of the present disclosure may obtain a synchronization expression from a path expression by replacing the node labels in the path expression with synchronization construct labels as follows. If a node n contains a sequence of synchronization constructs b1, . . . , bn, the method and system of the present disclosure in one embodiment may replace n with the concatenation b1 • . . . • bn. If n contains no synchronization constructs the method and system of the present disclosure in one embodiment may replace n with the empty symbol ø. An embodiment of the method and system of the present disclosure may assume that redundant empty symbols are eliminated from the expression whenever possible to improve readability of the expression. If the method and system of the present disclosure in one embodiment remember the sequence of ø eliminations, a synchronization expression can be transformed back to its original path expression, if needed. In another embodiment, synchronization expression may be constructed by traversing the program's AST.

Using Tarjan's fast path algorithm, building synchronization expressions takes O(E log N) time. For structured programs, constructing synchronization expressions can be done in linear time over the program's AST by following the nesting structure of the program.

Figure 5A:
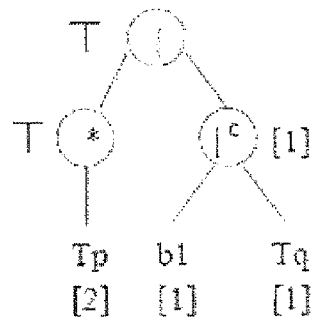
FIGS. 5A-5C illustrate synchronization trees.
Figure 5B:
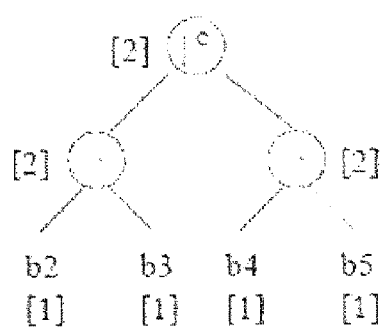
Figure 5C:
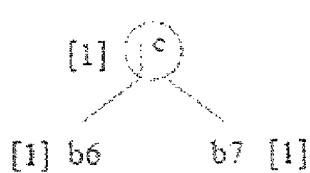

To simplify the discussion, the method and system of the present disclosure in one embodiment assume synchronization expressions are represented by their expression trees as shown in FIG. 5. These tree representations are referred to as synchronization trees.

To compute synchronization trees for the whole program the method and system of the present disclosure in one embodiment compute a separate synchronization tree Tp for each procedure p. The tree Tp represents the synchronization expression determined for the exit node of procedure p. A call inside p to another procedure q may be represented by the label Tq for the synchronization tree for procedure q. The whole program may be thus represented by a set of synchronization trees and the tree set may contain (B+C) leaf nodes, where B is the number of synchronization statements and C the number of procedure call sites in the program. It follows that the size of all synchronization trees for a programs is O(B+C).

FIG. 5 shows a program example with three procedures along with their synchronization (e.g., barrier) trees. The method and system of the present disclosure in one embodiment complete the synchronization tree construction by incorporating the information about concurrent meets from the multi-valued expression slice. The alternation and quantification symbols in a synchronization tree corresponds to the meet nodes for conditionals and loops of the program. The method and system of the present disclosure in one embodiment annotate synchronization trees by marking each alternation and quantification (or iteration) symbol as concurrent if the corresponding meet node in the multi-valued expression slice is marked as concurrent, for example, as determined from the previous multi-valued expression step.

After the concurrent split and meet points in the graph have been marked, the marks are transferred to the corresponding nodes in the synchronization expressions as follows. Every alternation operator in a synchronization expression corresponds to a meet node in the graph. The alternation operator is marked concurrent if the corresponding meet node in the graph was marled concurrent. Similarly, every iteration operator in a synchronization expression corresponds to a meet node in the graph and the iteration operator is marked as concurrent if the corresponding meet operator was marked concurrent. In FIG. 5, a marked concurrent alternation is shown as $|^C$. The resulting synchronization trees contain regular as well as concurrent alternation and quantification symbols.

The method and system of the present disclosure in one embodiment can now restate the synchronization matching problem from Definition 2.3 in terms of synchronization trees as follows: A synchronization tree t is well-matched if all concurrent synchronization sequences that can be derived from t have the same number of synchronization constructs.

Synchronization Matching

Definition 5.1. (Fixed-length Synchronization Tree): A synchronization tree t is called a fixed-length tree if all synchronization sequences derivable from t have the same number of synchronization constructs.

A tree that is not fixed-length is called variable-length. By induction on the size of t, if t is fixed-length then all subtrees of t are fixed-length. Fixed-length provides a sufficient but not necessary condition for a tree to be well-matched. In a fixed-length tree all derivable sequences have the same number of synchronization constructs, in a well-matched tree only the concurrent sequences are of the same length. The relationship between fixed-length and well-matched trees may be captured in the following statement in one embodiment.

(Matching Conditions) A synchronization tree t is well matched if and only if the following two conditions are satisfied:

(1) t contains no concurrent quantification (or iteration) subtrees (2) all concurrent alternations subtrees are fixed-length Proof Clearly, if any of the conditions (1) or (2) are violated, t cannot be well-matched. Conversely, assume t is not well-matched, that is, t derives at least two concurrent synchronization sequences of different lengths. It follows that t contains concurrent subtrees that are not fixed-length. In other words, there exists a variable-length subtree that is either a concurrent quantification subtree violating condition (1), or a concurrent alternation tree violating condition (2).

Next an algorithm is described that determines whether a tree is fixed-length using a linear-time bottom-up traversal of the synchronization trees. The traversal computes a synchronization count cnt(t) for each subtree t. If t is fixed-length cnt(t) is the length of synchronization sequences derivable from t. As an example, symbol T is used to denote a variable number of synchronization constructs. For all integer numbers n: T+n=T and T+T=T.

For each procedure p with a synchronization tree Tp, cnt (Tp) is initialized as follows: cnt(Tp)=0 if Tp is empty; T otherwise In one embodiment, Tp is considered empty only if procedure p contains no synchronization statements and no procedure calls.

Figure 6:
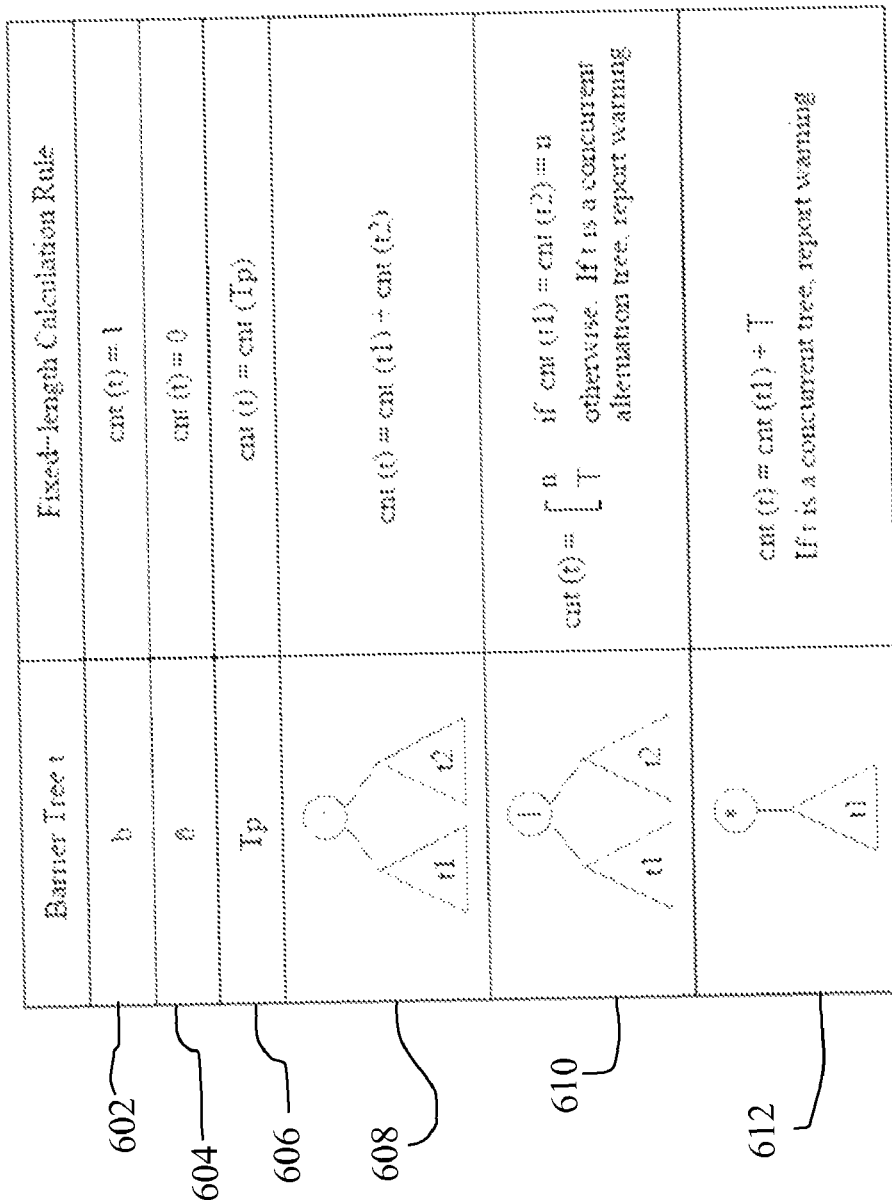
FIG. 6 illustrates fixed-length calculation rules.

The calculation of cnt(t) proceeds by applying the rules shown in FIG. 6 during a bottom-up traversal of t. It is easy to show by induction on the size of t that the calculation rules are correct, that is, cnt(t)=n with n≠T if and only if t is fixed-length and derives n synchronization constructs.

To analyze the synchronization expressions interprocedurally the method and system of the present disclosure in one embodiment traverse the call graph bottom-up and calculate cnt(Tp) for each procedure p. Recursion is handled safely through the initialization of cnt(Tp). For a non-empty tree Tp, the initial value T propagates throughout any recursive cycle, correctly indicating that the number of synchronization constructs that result from recursion is variable.

The method and system of the present disclosure in one embodiment use the fixed-length information to verify the matching conditions during a single traversal of the synchronization trees. At each visited concurrent alternation or quantification subtree the two matching conditions are verified by inspecting the computed cnt value. A synchronization error warning is issued when one of the conditions is violated. If no warnings are produced, the program is free of synchronization errors.

FIG. 5 shows the computed cnt values in brackets next to each synchronization (e.g., barrier) tree node. The computed counts show that the trees TP and TQ are fixed-length and Tmain is variable length. The example is well-matched because all concurrent alternation subtrees are fixed-length and there are no concurrent quantification subtrees. The complexity of applying the fixed-length calculation rules is linear, i.e., O(B+C).

FIG. 6 illustrates rules for computing length of a synchronization (e.g., barrier) tree t. If t contains one synchronization construct, then the count is one shown at 602. If t is empty, then count is set to zero shown at 604. If t contains a tree of a procedure ($T_p$), the count is set to the size of that tree as shown at 606. If t contains a concatenation of synchronization constructs or of subtrees of synchronization constructs, the count is the sum of the counts of the concatenated synchronization constructs or subtrees of synchronization constructs as shown at 608. If t contains alternations and each alternation size is the same, then the count is set to the size of one of the alternations, otherwise, the count is set to a variable number as shown at 610. If t contains quantification or iteration of a synchronization construct or subtree of synchronization constructs, the count is set to the size of the synchronization construct or subtree of synchronization constructs plus a variable number as shown at 612.

Synchronization Matching Functions

If no synchronization warnings are reported, the method and system of the present disclosure in one embodiment compute the matching function M that maps each synchronization statement b to the set of synchronization statements that synchronize with b, for some instance of b. If b1∈M(b2), the pair (b1, b2) is called a matching pair. Synchronization matching function, for example, informs which synchronization construct in one set of paths matches with or synchronizes with which synchronization construct in another set of paths.

Each verified concurrent alternation tree t=t1|c t2 contributes to the matching function by providing new matching pairs that match synchronization constructs in t1 with the concurrently executing synchronization constructs in t2.

Figure 7:
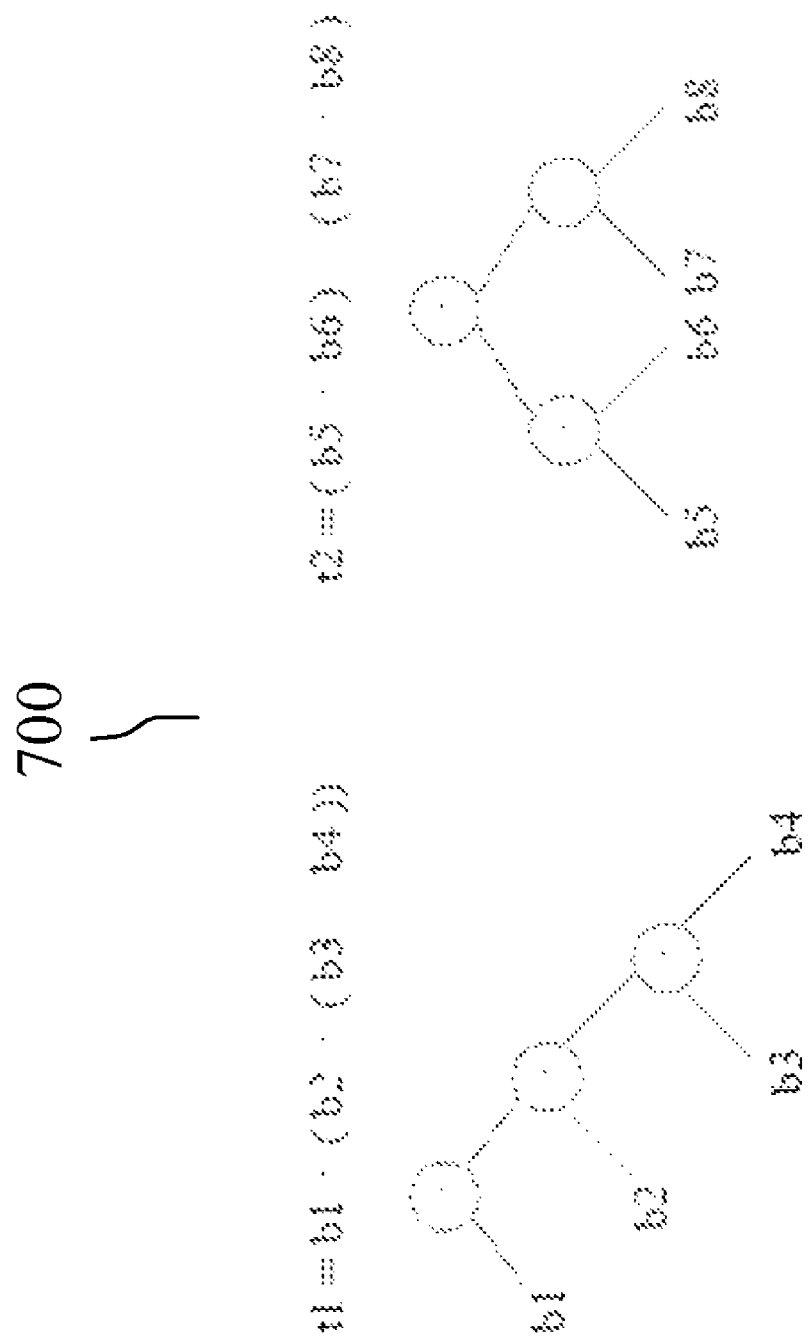
FIG. 7 illustrates concatenation trees.

First, consider the case where t1 and t2 are simple concatenation trees, that is, t1 and t2 only contain concatenation operations and all leaf nodes are synchronization constructs, as shown in the example 700 in FIG. 7. Thus, t1 and t2 each derive a single unique synchronization construct sequence and, because t was verified, the two unique sequences have the same length. To computing the matching sets for the two trees, the method and system of the present disclosure in one embodiment match synchronization constructs from t1 with synchronization constructs from t2 left-to-right, as they are encountered during a depth-first traversal of the trees.

In more general terms, let Match(t1, t2) denote the query to compute all matching pairs that result from matching synchronization constructs in t1 with synchronization constructs in t2. The method and system of the present disclosure in one embodiment compute Match(t1, t2) by simultaneously traversing the two subtrees in depth-first order through a finite number of applications of a set of matching rules shown in FIG. 8. To model a depth-first traversal each rule is associated with a state that denotes the current direction of the traversal (upwards ↑ or downwards ↓). Each matching rule transforms a directed query Match(t1, t2) into a new query with a new direction. Note that rules 1 and 4 change direction.

The matching rules in FIG. 8 correctly compute the matching sets between t1 and t2. For instance, applying the matching rules from FIG. 8 to two equal-length concatenation trees t1 and t2 leads to a complete depth-first traversal of t1 and t2. It can be seen that rules 1 through 4 only produce moves in depth-first order. Furthermore, it can be shown that for any combination of subtrees from t1 and t2 there is a rule that applies. Thus, all nodes in t1 and t2 will eventually be visited, completing the depth-first traversal. Applying the matching rules from FIG. 8 to two equal-length concatenation trees t1 and t2 matches each synchronization leaf node in t1 with exactly one leaf node in t2, and vice versa. That is, it is implied that each leaf node will be matched at least once. Let {b1, b2)} be one of those matches for leaf node b1 in tree t1. Thus, rule 1 has just been applied and the direction is upwards. For b1 to be involved in a subsequent match, direction would have to be changed again in order to descend to another leaf node in t2. Hence, rule 4 would have to be applied. However, rule 4 can only be applied to both subtrees simultaneously. Hence, b1 cannot be matched with another leaf in t2. The analogous argument shows that b2 cannot be matched against additional leaf nodes in t1. The above imply that for two concatenation trees t1 and t2 the matching rules match each synchronization construct in t1 correctly with a synchronization construct in t2.

Figure 9:
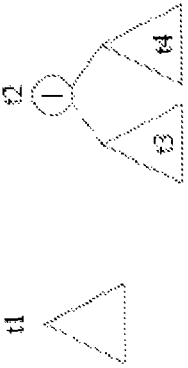
FIG. 9 illustrates barrier matching rules for alternation and procedure calls in one embodiment

In general, the subtrees t1 and t2 of a verified concurrent alternation tree do not only contain concatenations but also alternations and leaf nodes that denote procedure calls. FIG. 9 shows the extensions of the matching rules that handle these cases. For each matching rule in FIG. 9 there exists a symmetric counterpart, not shown here, where the roles of t1 and t2 are interchanged.

Alternation (rule 6) is handled by proceeding with two traversal sequences, one along each subtree of the alternation. The queries along the left subtree are resolved first before proceeding to the right subtree.

Procedure call leaf nodes (rule 7) are handled by continuing the traversal at the appropriate callee. To remember the correct call node when returning in the upwards direction, a stack is maintained for each traversal (LeftStack and RightStack) in one embodiment.

To compute the complete matching function M for the entire program, the matching rules in FIGS. 8 and 9 are applied for each verified concurrent alternation subtree.

Consider now the complexity of applying the matching rules. There are $O(B+C)$ nodes in the synchronization trees for the entire program so that the number of different queries that can be generated is $O((B+C)2)$. Repeated processing of the same query in the same direction is redundant and would only reproduce the same matches. The method and system of the present disclosure in one embodiment can avoid redundant re-traversals by maintaining a visited flag for each pair of trees. Using visited flags the method and system of the present disclosure in one embodiment can ensure that the rules are applied to each pair of trees at most twice (once in each direction) so that the overall complexity of applying the matching rules is $O((B+C)^2)$.

Applying the matching rules to our example from FIG. 5 produces Match queries for the three fixed-length concurrent alternation subtrees in FIG. 5. The matching function results as follows: M(b1)={b6, b7}, M(b2)={b4}, M(b3)={b5}, M(b4)={b2}, M(b5)={b5}, M(b6)={b1, b7}, and M(b7)={b1, b6}. Matching sets containing more than one element indicate the presence of textually unaligned synchronization constructs.

Counter Example

If the fixed-length calculation rules from FIG. 6 reveal a synchronization error the method and system of the present disclosure in one embodiment construct a counter example to illustrate the error. Assume t is an error tree, that is, t is either a concurrent quantification tree or a variable-length concurrent alternation tree. The counter example for t comprises two concurrent program paths that include different numbers of synchronization constructs.

The method and system of the present disclosure in one embodiment construct the counter example by extracting appropriate synchronization sequences from the error tree t and then expanding these sequences into program paths. If the error tree t contains alternations it represents multiple synchronization sequences and extracting a single sequences requires making a selection at each alternation point. The kind of selection depends on the characteristics of the error tree.

Consider an error tree t that is a concurrent quantification tree, that is, $t=(t1)^*$ with cnt(t)=T. Any sequence selected from t1 exemplifies the error because the sequence is cyclic. Thus, we extract a sample sequence from t1 by arbitrarily selecting one of the alternatives at each alternation operation.

Now consider an error tree t that is a concurrent alternation tree, that is, $t=t1|^C t2$. The method and system of the present disclosure in one embodiment select four sequences from t, the shortest and the longest synchronization sequence from each subtree t1 and t2. Among the four choices the method and system of the present disclosure in one embodiment obtain at least two sequences that have a different number of synchronization constructs because t1 and t2 are not equal-length. The method and system of the present disclosure in one embodiment construct the shortest (longest) synchronization sequence from a subtree during a bottom-up traversal. The traversal recomputes the count values cnt using the calculation rules from FIG. 6. However, when encountering an alternation subtree t the method and system of the present disclosure in one embodiment select the alternative with the lower (higher) synchronization count and recomputed the synchronization count for t by copying the synchronization count from the selected alternative.

It remains to expand the selected synchronization sequences into program paths. This expansion is done by reversing the transformations that were performed when first constructing the synchronization expression from the corresponding path expression.

The multi-valued expression slicing and synchronization matching of the present disclosure may be used for MPI/C programs. The multi-valued expression slicing and synchronization matching of the present disclosure may be built on top of known tools such as the open-source CDT (C Development Tool).

MPI offers the concept of communicators to limit the scope of a synchronization construct to a specific subset of the executing threads. The default communicator is MPI COMM WORLD which includes all MPI threads. To handle MPI-style communicators, the multi-valued expression slicing and synchronization matching of the present disclosure may be used as a tool that analyzes the program separately for each communicators In one embodiment, an implementation of the multi-valued expression slicing and synchronization matching of the present disclosure may treat pointers conservatively, for example, every dereference of a pointer and every variable whose address is taken, except function parameters, may be considered to be multi-valued. In one embodiment, function pointers may not be handled. Aliases of communicators may be handled by conservatively assuming separate communicators. In most cases a simple Anderson's style pointer analysis may be sufficient to accurately determine the aliases of communicators. Experimentation results of the method and system of the present disclosure in various embodiments show that even a conservative handling of pointers does not produce spurious warnings for a benchmark set.

In one embodiment, the method and system verifies synchronization using a combination of program slicing and path expressions. The method and system in one embodiment computes synchronization expressions as a compact representation of the synchronization structure of the program and as a foundation to synchronization matching. The method and system in one embodiment performs synchronization matching analysis by computing the synchronizing statements in addition to the verification result. Information about synchronizing statements can be used to identify and eliminate textually unaligned synchronization statements.

A user interface such as a graphical user interface may be integrated with the method and system of the present disclosure. The graphical user interface, for example, may be used to visualize the analysis results as well as for other functionalities. For instance, matching function and/or counter examples may be presented, for example, graphically or otherwise. Further, in addition to using a path expression based approach to model collective synchronization, the method and system of the present disclosure may be extended work to analyze point-to-point message passing communication.

The system and method of the present disclosure may be implemented and run on a general-purpose computer or computer system. The system and method of the present disclosure may be also implemented and run on a specialized computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for detecting synchronization errors in a program, comprising:
    determining concurrent paths in a program with synchronization or one or more procedures or in a program with a combination of synchronization and one or more procedures;
    constructing one or more synchronization expressions in the concurrent paths;
    determining whether said one or more synchronization expressions match; and
    computing a matching function that maps synchronization statements in said one or more synchronization expressions if said one or more synchronization expressions match.

2. The method of claim 1, wherein the step of determining concurrent paths includes:
    building a control flow graph of the program;
    inserting one or more φ-nodes at a point in the program where one or more threads meet;
    inserting one or more φ-gates at a point in the program where said one or more threads split;
    generating one or more φ-edges connecting the said one or more φ-nodes and said one or more (φ-gates;
    building a system dependence graph using said one or more φ-edges in place of control dependence edges;
    marking one or more multi-valued seed expression in the control flow graph using the system dependence graph; and
    computing an interprocedural slice as a set of nodes reachable from the multi-valued seed expression, said interprocedural slice representing the concurrent paths in the program.

3. The method of claim 1, wherein the synchronization includes collective synchronization.

4. The method of claim 1, wherein the synchronization includes one-to-one synchronization.

5. The method of claim 1, wherein the step of determining whether said one or more synchronization expressions match includes comparing said one or more synchronization expressions using one or more predetermined rules.

6. The method of claim 1, further including:
    presenting the matching function via a user interface.

7. The method of claim 1, wherein one or more synchronization errors in the program are detected statically without running the program.

8. The method of claim 1, wherein the step of determining concurrent paths includes deriving concurrent paths from one or more program points at which concurrent threads split and one or more program points at which the concurrent threads meet.

9. The method of claim 8, wherein the method includes computing one or more multi-valued expressions in the program to determine said one or more program points at which concurrent threads split and said one or more program points at which the concurrent threads meet.

10. The method of claim 1, further including:
    constructing a counter example to illustrate an error if said one or more synchronization expressions do not match.

11. The method of claim 10, wherein the step of constructing a counter example includes constructing the counter example by extracting one or more synchronization sequences from an error synchronization expression and expanding said one or more synchronization sequences into one or more program paths.

12. The method of claim 10, further including:
    presenting the counter example via a user interface.

13. A method for detecting synchronization errors in a program, comprising:
    determining concurrent paths in a program with synchronization or one or more procedures or in a program with a combination of synchronization and one or more procedures;
    constructing one or more synchronization expressions in the concurrent paths;
    determining whether said one or more synchronization expressions match;
    computing a matching function that maps synchronization statements in said one or more synchronization expressions if said one or more synchronization expressions match; and
    constructing a counter example to illustrate an error if said one or more synchronization expressions do not match.

14. A system for detecting synchronization errors in a program, comprising:
    means for determining concurrent paths in a program with synchronization or one or more procedures or in a program with a combination of synchronization and one or more procedures;
    means for constructing one or more synchronization expressions in the concurrent paths;
    means for determining whether said one or more synchronization expressions match;
    means for computing a matching function that maps synchronization statements in said one or more synchronization expressions if said one or more synchronization expressions match; and
    means for constructing a counter example to illustrate an error if said one or more synchronization expressions do not match.

15. The system of claim 14, wherein the synchronization includes collective synchronization.

16. The system of claim 14, wherein the synchronization includes one-to-one synchronization.

17. The system of claim 14, further including a user interface operable to present the matching function or the counter example, or combination of both.

18. The system of claim 14, wherein the means for determining concurrent paths includes:
    means for computing one or more multi-valued expressions in the program to determine said one or more program points at which concurrent threads split and said one or more program points at which the concurrent threads meet.

19. The system of claim 14, wherein the means for determining concurrent paths includes:
    means for building a control flow graph of the program;
    means for inserting one or more φ-nodes at a point in the program where one or more threads meet;
    means for inserting one or more φ-gates at a point in the program where said one or more threads split;
    means for generating one or more φ-edges connecting the said one or more φ-nodes and said one or more φ-gates;
    means for building a system dependence graph using said one or more φ-edges in place of control dependence edges;
    means for marking one or more multi-valued seed expression in the control flow graph using the system dependence graph; and
    means for computing an interprocedural slice as a set of nodes reachable from the multi-valued seed expression, said interprocedural slice representing the concurrent paths in the program.

20. A program storage device readable by a machine, tangibly embodying a program of instructions executable by the machine to perform a method of detecting one or more synchronization errors in one or more programs, comprising:
    determining concurrent paths in a program with synchronization or one or more procedures or in a program with a combination of synchronization and one or more procedures;
    constructing one or more synchronization expressions in the concurrent paths;
    determining whether said one or more synchronization expressions match; and
    computing a matching function that maps synchronization statements in said one or more synchronization expressions if said one or more synchronization expressions match.

* * * * *